United States Patent
Bai et al.

(10) Patent No.: US 9,430,476 B2
(45) Date of Patent: Aug. 30, 2016

(54) METHOD AND APPARATUS OF USER RECOMMENDATION SYSTEM FOR IN-VEHICLE APPS

(71) Applicant: GM GLOBAL TECHNOLOGY OPERATIONS LLC, Detroit, MI (US)

(72) Inventors: Fan Bai, Ann Arbor, MI (US); Donald K. Grimm, Utica, MI (US); Massimo Osella, Troy, MI (US); Leonard C. Nieman, Warren, MI (US); Robert A. Hrabak, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 301 days.

(21) Appl. No.: 14/210,047

(22) Filed: Mar. 13, 2014

(65) Prior Publication Data

US 2015/0261754 A1 Sep. 17, 2015

(51) Int. Cl.
*G06F 17/30* (2006.01)
*G06Q 30/02* (2012.01)

(52) U.S. Cl.
CPC ..... *G06F 17/30029* (2013.01); *G06Q 30/0282* (2013.01); *G06F 17/3053* (2013.01); *G06F 17/3089* (2013.01); *G06F 17/30864* (2013.01)

(58) Field of Classification Search
CPC ........... A61K 2300/00; A61K 31/138; C07K 2319/00; G07F 17/3053; G06F 17/30699; G06F 17/3053; G06F 17/3089; G06F 17/30864; G06Q 30/0201
USPC .......... 701/533, 36; 707/749, 740, 724, 722, 707/769, 748
See application file for complete search history.

(56) References Cited

U.S. PATENT DOCUMENTS

| | | | |
|---|---|---|---|
| 8,626,774 B2 * | 1/2014 | Avadhanam | G06F 17/3053 707/748 |
| 9,125,000 B2 * | 9/2015 | LaMarca | H04W 4/02 |
| 9,189,551 B2 * | 11/2015 | Goodson | G06F 17/30864 |
| 9,195,721 B2 * | 11/2015 | Soto Matamala | G06F 17/3089 |
| 2011/0258044 A1 * | 10/2011 | Kargupta | G06Q 10/08 705/14.49 |
| 2011/0320967 A1 | 12/2011 | Knitowski | |
| 2013/0024456 A1 * | 1/2013 | Goodson | G06F 17/30864 707/740 |
| 2013/0079971 A1 * | 3/2013 | Raghunathan | G07C 5/008 701/31.4 |
| 2013/0151288 A1 * | 6/2013 | Bowne | G06Q 10/0639 705/4 |
| 2013/0174211 A1 * | 7/2013 | Aad | G06F 21/604 726/1 |

(Continued)

*Primary Examiner* — Jean M Corrielus
(74) *Attorney, Agent, or Firm* — John A. Miller; Miller IP Group, PLC (57) ABSTRACT

A method and system for recommending applications to users of in-vehicle infotainment systems are disclosed. Application rating data from many road vehicle infotainment system users are collected on a central server, including both explicit ratings and implicit ratings. Implicit ratings may be calculated based on application usage data. The user/application rating data is filtered for relevance, and then analyzed to determine inferred ratings for user/application relationships where no rating exists. The inferred ratings are calculated using both a user-driven consensus rating calculation and an application-driven consensus rating calculation. The inferred ratings, along with optional cyberspace-based external inputs, are used to synthesize application recommendations for users. The synthesized recommendations for application consideration are provided to the appropriate user via downloading from the central server to the infotainment system in the user's vehicle.

20 Claims, 7 Drawing Sheets

(56) References Cited

U.S. PATENT DOCUMENTS

| | | | |
|---|---|---|---|
| 2013/0179198 A1* | 7/2013 | Bowne | G06Q 10/0639 705/4 |
| 2013/0212160 A1 | 8/2013 | Lawson | |
| 2013/0265178 A1 | 10/2013 | Tengler | |
| 2013/0290319 A1* | 10/2013 | Glover | G06F 17/3053 707/723 |
| 2013/0325856 A1* | 12/2013 | Soto Matamala | G06F 17/3089 707/724 |
| 2013/0339345 A1* | 12/2013 | Soto Matamala | G06F 17/3089 707/722 |
| 2014/0106726 A1* | 4/2014 | Crosbie | H04W 4/046 455/418 |
| 2014/0129139 A1* | 5/2014 | Ellison | G01C 21/3469 701/533 |
| 2014/0171052 A1* | 6/2014 | Lamarca | H04W 4/001 455/418 |
| 2014/0244741 A1* | 8/2014 | Lasky | H04L 67/22 709/204 |
| 2014/0277937 A1* | 9/2014 | Scholz | G06F 7/00 701/36 |
| 2014/0379747 A1* | 12/2014 | Majumder | G06F 17/30864 707/769 |
| 2015/0317668 A1* | 11/2015 | Tietzen | G06Q 30/0239 705/14.39 |

\* cited by examiner

METHOD AND APPARATUS OF USER RECOMMENDATION SYSTEM FOR IN-VEHICLE APPS

BACKGROUND OF THE INVENTION

1. Field of the Invention

This invention relates generally to a method and apparatus for recommending applications to users of in-vehicle infotainment systems, where the recommendations are derived from existing user/application rating data which are collected from infotainment system users, filtered and analyzed to produce both a user-driven consensus rating and an application-driven consensus rating for user/application relationships where no rating exists.

2. Description of the Related Art

Information/entertainment systems, or "infotainment systems", have become very popular in vehicles, as the functionality and performance of electronic systems has skyrocketed, Internet access in vehicles has become widely available, and user capabilities and expectations have grown accordingly.

Infotainment systems in modern vehicles not only allow a driver or passenger to interact with a smart phone or mobile device, the systems also provide their own built-in infotainment functionality—including features like storing and playing media files, running native applications ("apps"), connecting to the Internet for file access and real-time data, etc.

As vehicle manufacturers roll out more built-in infotainment systems, developers have responded by making more apps available for the vehicle infotainment systems. For some brands of vehicle manufacturer infotainment systems, there are now thousands of apps available for download and execution. As the app space becomes more populated, it becomes more difficult for a driver or a passenger in a vehicle to find the apps that they may be most interested in. This is particularly true because a driver is concentrating on driving and not on browsing for apps.

Existing app usage trackers, on smart phones and the like, are limited to simple tracking of app usage for the purposes of conserving battery life or minimizing cellular data transfer. Likewise, existing app recommendation engines typically only evaluate simple parameters such as app category. Much more can be done to understand app usage trends and to assist vehicle drivers and passengers in finding and executing apps that are likely to be enjoyed by them personally and/or useful to them in the current context of the vehicle driving environment.

SUMMARY OF THE INVENTION

In accordance with the teachings of the present invention, a method and system for recommending applications to users of in-vehicle infotainment systems are disclosed. Application rating data from many road vehicle infotainment system users are collected on a central server, including both explicit ratings and implicit ratings. Implicit ratings may be calculated based on application usage data. The user/application rating data is filtered for relevance, and then analyzed to determine inferred ratings for user/application relationships where no rating exists. The inferred ratings are calculated using both a user-driven consensus rating calculation and an application-driven consensus rating calculation. The inferred ratings, along with optional cyberspace-based external inputs, are used to synthesize application recommendations for users. The synthesized recommendations for application consideration are provided to appropriate users by downloading from the server to the infotainment system in the user's vehicle.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method and apparatus of providing a user recommendation system for in-vehicle apps is merely exemplary in nature, and is in no way intended to limit the invention or its applications or uses.

Infotainment systems in modern vehicles not only allow a driver or passenger to plug in a smart phone or mobile device, the systems also provide their own built-in infotainment functionality—including features like storing and playing media files, running native applications ("apps"), accessing the Internet for file access and real-time data, etc. Several vehicle manufacturers now offer infotainment systems, and app developers have responded by releasing thousands of apps for these infotainment systems.

With the number of available apps being somewhat overwhelming, consumers will increasingly turn to recommendation engines or other information sources to discover relevant and useful mobile applications, rather than sorting through the thousands of mobile apps available. Infotainment system users can benefit from accurate and timely recommendations of apps that may be of interest to them personally, or in their current vehicle driving context. Similarly, vehicle manufacturers can benefit from data indicating app usage trends, as this data can be useful in optimizing hardware and operating systems of future infotainment systems.

Figure 1:
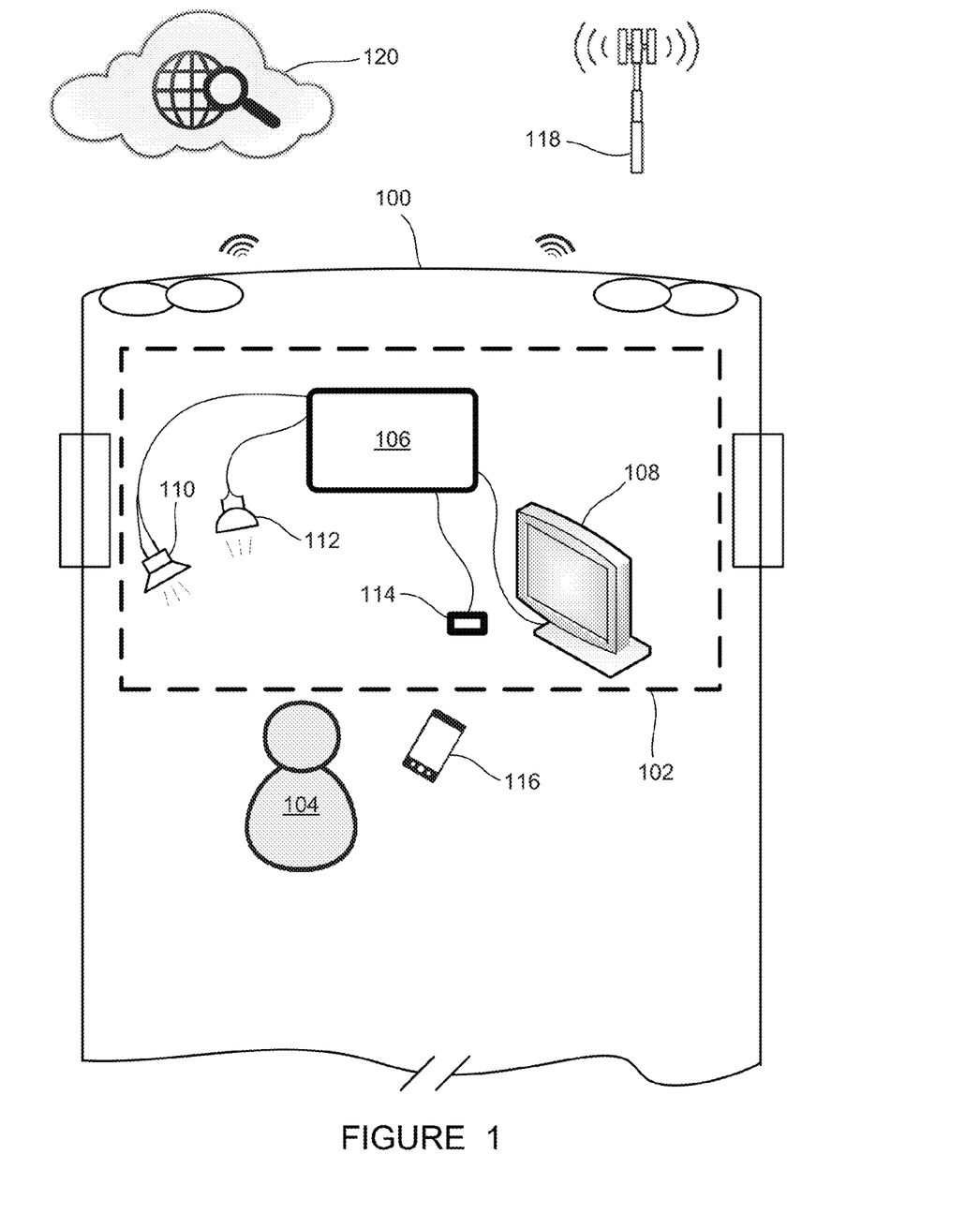
FIG. 1 is a schematic diagram of a vehicle including an infotainment system which is configured to track in-vehicle app usage, predict usage trends and make recommendations to a user.

FIG. 1 is a schematic diagram of a vehicle 100 including an infotainment system 102 which is configured to track in-vehicle app usage, predict usage trends and make recommendations to a user 104. The infotainment system 102 includes at least a processor 106 and a display 108. The infotainment system 102 also includes at least one speaker 110 for providing audio output in the vehicle 100, and at least one microphone 112 for receiving audio input from the user 104.

The processor 106 is illustrated in FIG. 1 and described herein as a discrete element, however, such illustration is for ease of description and it should be recognized that the functions performed by this element may be combined in one or more devices, e.g., implemented in software, hardware, and/or application-specific integrated circuitry. The processor 106 may be a special-purpose or general-purpose digital computer comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The processor 106 has a set of processing algorithms, described in the methods discussed below, comprising resident program instructions and calibrations stored in the non-volatile memory and executed to provide the respective functions. The algorithms may be executed during preset time-based loop cycles, or the algorithms may be executed in response to occurrence of an event.

The display 108 may be shared with a vehicle navigation system, climate control interface, or for other purposes in the vehicle 100. The display 108 is commonly a touch screen design, where options can be displayed on screen and selections made by the user 104 touching the screen of the display 108.

The infotainment system 102 also includes an input/output port 114, which may preferably be a Universal Serial Bus (USB) port. The port 114 can be used for connecting mobile devices and smart phones, such as a smart phone 116, to the infotainment system 102 using an adapter cable (not shown). When connected to the infotainment system 102 via the port 114, the smart phone 116 can be charged, can stream music or video to the infotainment system 102, along with other functions. Alternately, the smart phone 116 can wirelessly communicate with the infotainment system 102 using Bluetooth, Wi-Fi, Near Field Communication (NFC) or any other short range wireless communications protocol.

The vehicle 100, and the infotainment system 102 specifically, can communicate wirelessly with a cellular service 118 and the Internet 120. Vehicle Internet access may be achieved via the cellular service 118, or it may bypass the cellular service 118 and reach the Internet 120 via some other form of wireless communication, such as vehicle-to-infrastructure communications using Dedicated Short Range Communications (DSRC) or external Wi-Fi, for example. The cellular service 118 may also be used to reach a telematics service, which provides amenities such as navigation and concierge services, and also may be used in the app usage tracking, prediction and recommendation services discussed below.

Figure 2:
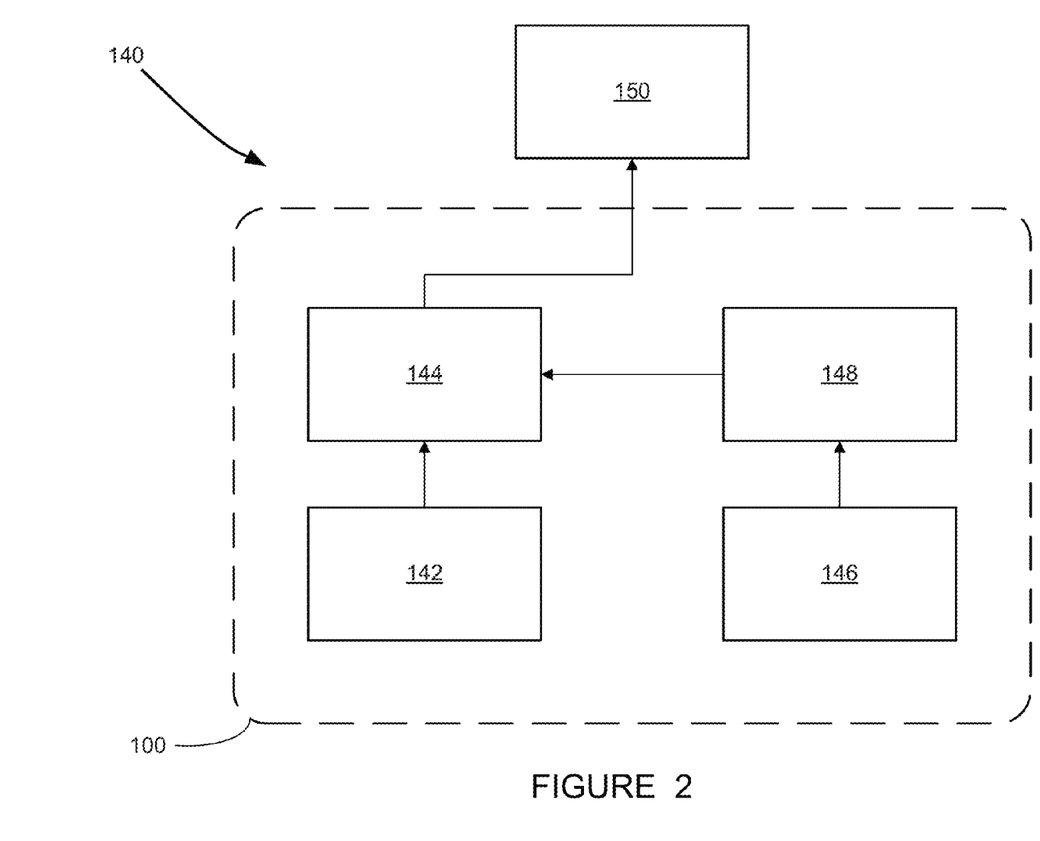
FIG. 2 is a block diagram of an architecture which can be used for tracking in-vehicle app usage and predicting usage trends of apps.

FIG. 2 is a block diagram of an architecture 140 which can be used for tracking in-vehicle app usage and predicting usage trends of apps. In the architecture 140, the modules inside the dashed rectangle are onboard the vehicle 100. An in-vehicle app usage collection module 142 collects data about app usage in the infotainment system 102. Information collected by the app usage collection module 142 includes user interaction with an app store, such as viewing an app in the app store, downloading (for free) an app, purchasing an app (for a cost value which is stored for future use), and subsequent use of the app after download or purchase. The app usage collection module 142 also records each usage of each app so that recency of use data is always available, along with frequency of use of each app and duration of each usage of each app.

Using the data described above, the app usage collection module 142 can quantify an implicit rating r of the user 104 toward each app, as follows:

$$r = w_{R1} \cdot V_{R1} + w_{R2} \cdot V_{R2} + w_F \cdot V_F + w_D \cdot V_D + w_M \cdot V_M \quad (1)$$

Where $V_{R1}$ is a value defining recency of viewing the app, $V_{R2}$ is a value defining recency of using the app, $V_F$ is a value defining frequency of using the app, $V_D$ is a value defining duration of using the app, and $V_M$ is a value defining a monetary value (or amount paid) for the app. The w variables are weighting values for the respective values V in the equation, and are inter-related such that $w_{R1} + w_{R2} + w_F + w_D + w_M = 1$.

A cross-reference module 144 receives app usage data and app rating data from the app usage collection module 142. Using the app usage and rating data—along with other data described below—the cross-reference module 144 performs local (onboard the vehicle 100) data analysis of app usage trends, as is discussed further below.

A CAN bus information collection module 146 collects data from the vehicle CAN bus (Controller Area Network bus)—or any other available vehicle data bus—regarding all aspects of vehicle operation. Data collected by the CAN bus information collection module 146 may include vehicle speed, whether transmission is in park or a drive gear, time duration and distance traveled in a driving trip, navigation and GPS data, anti-lock brake system (ABS) usage data, traction control system data, windshield wipers on or off, occupancy status of each seat in the vehicle, and other parameters. The CAN bus information collection module 146 may also record the identity of the driver, if driver identification information is available.

A context relevance identification module 148 receives the raw vehicle operation data from the CAN bus information collection module 146, processes it, and provides vehicle operational context indicators to the cross-reference module 144. The idea here is that, under different vehicle context scenarios, different apps might have different levels of popularity. Therefore, app usage patterns under particular vehicle context scenarios are more meaningful information than just the app usage data alone. The operational context indicators provided by the context relevance identification module 148 may indicate, for example, that at a particular time the vehicle 100 is driving versus parked, is on a comparatively long driving trip, is on a certain roadway type (highway, surface street, gravel, etc.), under certain road conditions (high or low friction) and traffic conditions (light, normal or congested), with or without children in the back seats, whether the current vehicle location is frequently or infrequently visited, and whether the driver is using navigation assistance. Driver identity may also be included as a context indicator. Many different types of contextual references may be derived by the context relevance identification module 148 using the raw data from the CAN bus information collection module 146, including other contexts not listed above.

The contextual references derived by the context relevance identification module 148 can be used by the cross-reference module 144 to determine relationships between app usage and vehicle operational context. For example, it may be learned from the data that a driver likes to use a particular navigation app whenever driving in an unfamiliar location, or the driver may wish to check her email every day while driving to work, where the route of travel could be detected by the navigation system data, and the email app could be used in an audio/voice recognition mode. The cross-reference module 144 can use any appropriate statistical or numerical techniques to identify correlations between the app usage data and the vehicle contextual reference data.

The app usage data and app/context correlation data from the cross-reference module 144 is provided to a cloud-based aggregation and trend tracking module 150. The aggregation and trend tracking module 150 resides on a device such as an Internet server which can collect and disseminate data from/to many vehicles on the road. For example, a particular vehicle manufacturer may use its telematics service (such as OnStar®) to upload app usage data and app/context correlation data from thousands or millions of road vehicles. Alternately, the aggregation and trend tracking module 150 may be configured to collect data from the cross-reference module 144 onboard vehicles when the vehicles have wireless Internet access. Regardless of how the vehicles communicate their data to the server, the aggregation and trend tracking module 150 aggregates the app usage data across many users and vehicles, and analyzes the aggregated data to yield app usage trends for the entire population of users.

As would be understood by one skilled in the art, references in this disclosure to an Internet server, or central server computer, imply a computer or cluster of computers including at least a microprocessor or central processing unit, memory and a network connection. The server computers may be configured with algorithms for analyzing app usage and rating data, tracking usage trends, recommending apps to users, etc.

Various metrics can be computed by the aggregation and trend tracking module 150 based on the app usage data from many users and vehicles. One metric which can be computed is a popularity $H_{APP(i)}(t)$ of an app i, which can be calculated from the rating r (from Equation 1) using statistics such as mean and standard deviation over the entire population of users from whom data is collected.

Another metric which can be computed is a time-weighted activity $Activity_{APP(i)}$ of an app i. The intent of the time-weighted activity metric is to serve as an indicator of the app's activity level among users, with more weight given to more recent usage. The time-weighted activity is computed over a window of past time, such as the past month, or the past year, as follows:

$$Activity_{APP(i)} = \sum_{t=-n}^{0} H_{APP(i)}(t) \cdot a^t \qquad (2)$$

Where the summation is over a time t which runs from the past time (−n) to the current time (0), $H_{APP(i)}(t)$ is the popularity, and a is a constant. It is noted that, because t is always negative in Equation 2, the factor $a^t$ becomes quite small (much less than 1) for times more distant in the past, and the factor $a^t$ becomes more nearly equal to 1 for times near the current time, thus providing the time-weighting described previously.

Another metric which can be computed is a demographic or geographic diversity $Diversity_{APP(i)}$ of an app i. The intent of the diversity metric is to serve as an indicator of the diversity of the users of the app, including demographic and geographic diversity, and possibly other types. The diversity of an app is computed by first dividing the user community into a number of groups G and computing a penetration P of the app into each of the groups G using the following equation:

$$P(G)_{APP(i)} = \frac{|n(G)|}{N} \qquad (3)$$

Where $P(G)_{APP(i)}$ is the penetration into group G of the app i, n is the number of users of the app i in the group G, and N is the number of overall users in all groups. As an example, the groups G may represent demographic groups based on age or ethnicity, where there may be about 8-10 different groups. The groups G may also represent geographic groups based on global region, region of the United States, or some other geographic segmentation. Once the groups are defined and their penetration by each app is calculated, then the diversity metric is computed as follows:

$$Diversity_{APP(i)} = -\sum_{G} P_{APP(i)} \cdot \log(P_{APP(i)}) \qquad (4)$$

Where the summation is computed over all groups G, and the penetration value P was defined in Equation 3.

Another metric which can be computed is an upward trend indicator $Uptrend_{APP(i)}$ of an app i. The intent of the uptrend metric is to serve as an indicator of an upward or downward trend in an app's activity level among users, and it is computed relative to the trends of all apps in order to account for overall app usage trends. The uptrend of an app is determined by first computing a Slope, or trend of activity of each app over a past time period. Slope is defined as the slope of the Activity metric versus time, and can be computed using linear regression or another suitable statistical technique. The uptrend metric is then computed over a window of past time, such as the past month or the past year, as follows:

$$Uptrend_{APP(i)}(t) = \overline{m}(H_{APP(i)}) + (Slope_{APP(i)} - \overline{Slope}) \cdot t \qquad (5)$$

Where $\overline{m}(H_{APP(i)})$ is the mean value of the popularity H of the app i over the time period, $Slope_{APP(i)}$ is the slope metric described immediately above, $\overline{Slope}$ is the average (mean) slope of all apps during the time period, and t is the time period.

Any of the metrics described above can be further refined by including the app/context correlation data in the calculations. For example, a popularity could be computed for situations with back seat passengers. Other metrics can also be envisioned, in addition to those detailed above, which could be computed by the aggregation and trend tracking module 150 based on the app usage, rating and context data from many users and vehicles.

The app usage trends for the entire population of users which are computed by the aggregation and trend tracking module 150 can be used for multiple purposes. A vehicle manufacturer can use the app usage trend data for optimizing future infotainment system designs, by understanding processing and memory requirements, how the infotainment system operating system and human-machine interfaces can be improved based on app usage patterns, etc. The app usage trend data can also be given or sold to app developers to help the developers better understand the usage of their apps and others of the same type. The app usage trend data can also be used to make recommendations to users regarding download, purchase or use of certain apps. Trend data could also be used to price advertisements within applications.

Figure 3:
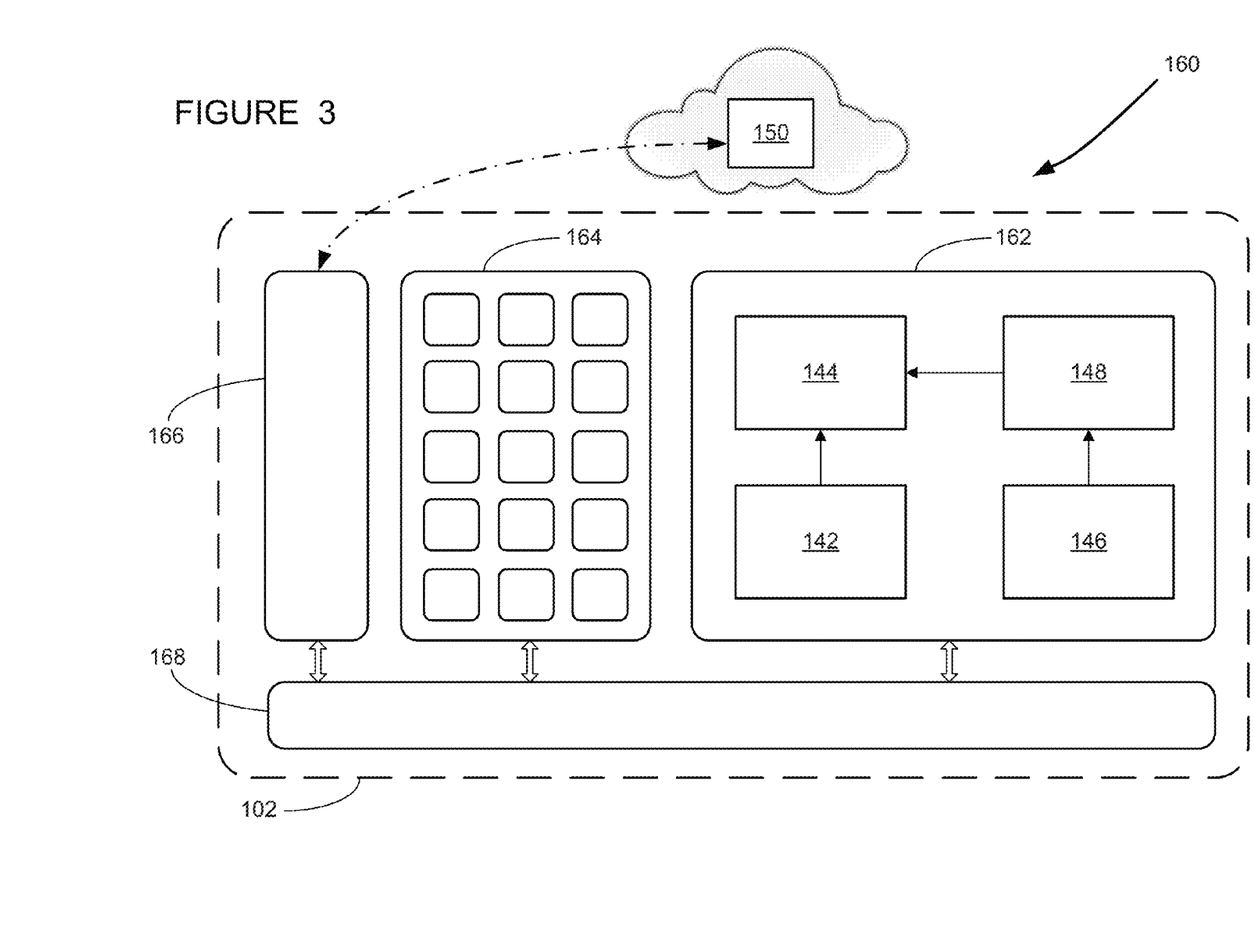
FIG. 3 is a block diagram of a system which represents one embodiment of the architecture of FIG. 2 for tracking in-vehicle app usage and predicting usage trends of apps.

FIG. 3 is a block diagram of a system 160 which represents one embodiment of the architecture 140 for tracking in-vehicle app usage and predicting usage trends of apps. In the system 160, the app usage collection module 142, the cross-reference module 144, the CAN bus information collection module 146, and the context relevance identification module 148 are grouped together in a data collection app 162 which runs on the infotainment system 102. Alternately, the modules 142-148 could each be individual apps, or could be grouped some other way. In any case, these data collection and analysis modules run as one or more apps on the infotainment system 102. The app 162 (or multiple apps) would be developed by the vehicle manufacturer and would always be running in a background mode on the infotainment system 102.

A set of user apps 164 also run on the infotainment system 102. The user apps 164 are a plurality of apps downloaded and/or purchased by the user 104, and may be developed by any developer. The user apps 164 are the apps that provide features and functions desired by the user, similar to those on the smart phone 116. That is, the user apps 164 can be used for things like entertainment, weather, news, sports, navigation, gaming, etc. It is the user apps 164 to which the usage trend tracking is directed.

A gateway app 166 also runs on the infotainment system 102. The gateway app 166 is also developed by the vehicle manufacturer and would always be running in a background mode on the infotainment system 102. The gateway app 166 serves as a two-way communication interface between the infotainment system 102 and the aggregation and trend tracking module 150 which resides on a cloud-based server. A primary function of the gateway app 166 is to send the app usage data and app/context correlation data from the cross-reference module 144 to the aggregation and trend tracking module 150.

An app framework 168 resides on the infotainment system 102 and serves as a foundation for all resident apps. In particular, the app framework 168 allows download and usage data for the user apps 164 to be collected by the app usage collection module 142 in the data collection app 162. The app framework 168 also allows the app usage data and app/context correlation data from the cross-reference module 144 to be picked up by the gateway app 166, which sends it to the aggregation and trend tracking module 150.

Figure 4:
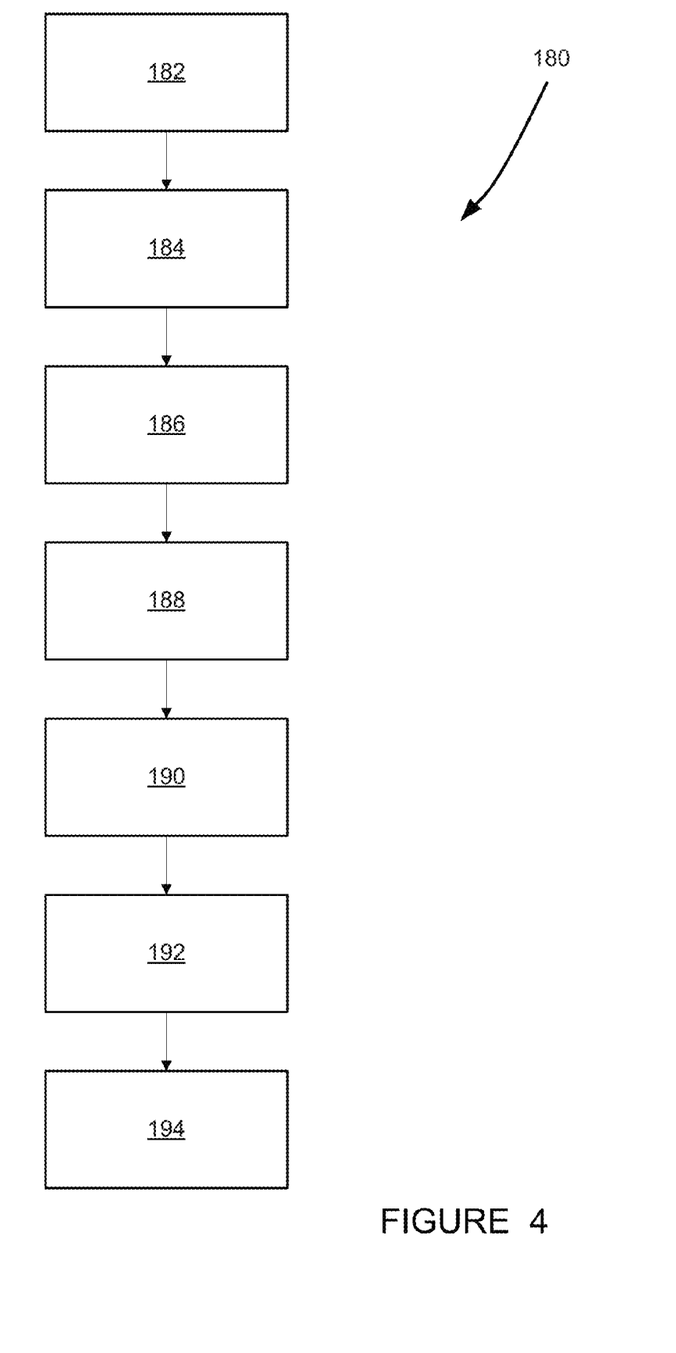
FIG. 4 is a flowchart diagram of a method for tracking and predicting usage trends of in-vehicle apps.

FIG. 4 is a flowchart diagram 180 of a method for tracking and predicting usage trends of in-vehicle apps. At box 182, usage data for a plurality of user apps is collected, as discussed in the description of the app usage collection module 142. At box 184, an implicit user rating is computed for each of the user apps, using Equation 1. At box 186, vehicle operational data is collected from the vehicle CAN bus. As discussed previously regarding the CAN bus information collection module 146, the data collected from the CAN bus includes any vehicle operational parameters which may be useful in determining a driving situational context. At box 188, vehicle operational context indicators are computed from the operational data from the CAN bus. As discussed previously, the context indicators designate the type of driving scenario which is being experienced at any given time, such as a short solo drive to work in heavy traffic, or a long cross-country trip with kids in rainy weather, etc.

At box 190, the app usage and rating data and the context indicator data are used to compute app/context correlations indicating app usage trends as they relate to vehicle situational contexts, for the user 104 in the vehicle 100. As discussed in detail above, the steps of the flowchart boxes 182-190 are performed in the infotainment system 102 onboard the vehicle 100. At box 192, the app usage and rating data and the app/context correlations are provided to a server computer for aggregation across many vehicles. As discussed previously, the server computer may be an Internet-based server or a telematics service server. At box 194, app usage trends for the entire population of users are computed from the app usage data and app/context correlations. The app usage trends comprise various metrics which can be computed, including app popularity, time-weighted activity, diversity and uptrend. The app usage trends can be used by the vehicle manufacturer, app developers and others.

As discussed previously, as the infotainment system app market becomes more populated, it becomes more difficult for a driver or a passenger in a vehicle to find the apps that they may be most interested in. With the number of available apps—in the thousands or tens of thousands—being somewhat overwhelming, consumers will increasingly turn to recommendation engines or other information sources to discover relevant and useful mobile applications, rather than sorting through the mobile app market manually. The app usage and rating data collected from many vehicles, described in detail above, can also be used as a basis for making app recommendations to individual users.

Existing app recommendation tools provide only rudimentary capability, using techniques such as sorting by app category to recommend other apps to a user, or using social networking friend circles for recommendations. However, using app rating data from thousands or millions of users of infotainment system apps, similarities can be identified which allow accurate app recommendations to be made to individual users. Specifically, the recommendation system disclosed here collects ratings by many different users for many different apps, and then uses a similarity engine to make accurate app recommendations by determining application similarities across users and user similarities across applications. These techniques are discussed below.

Figure 5:
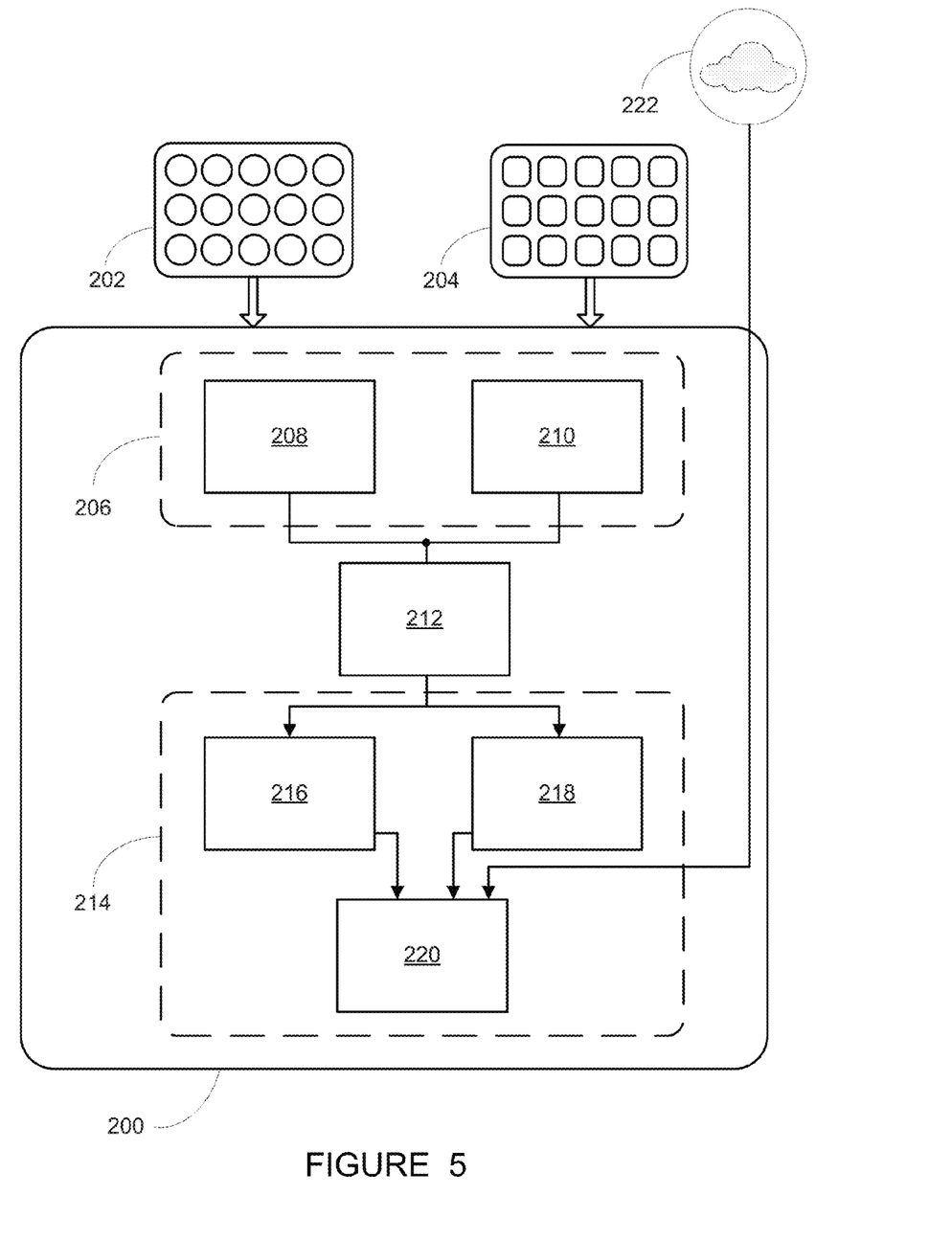
FIG. 5 is a block diagram of a system for making user recommendations for infotainment system apps.

FIG. 5 is a block diagram of a system 200 for making user recommendations for infotainment system apps. The system 200, including the several modules described below, can be embodied in an algorithm or multiple algorithms running on a server computer which can receive wirelessly uploaded data from many vehicle infotainment systems, as discussed previously. A set of users 202 use the infotainment systems in the vehicles which provide data to the system 200. For a fully deployed system, the set of users 202 may number in the millions. A set of apps 204 reside on the infotainment systems in the vehicles which provide data to the system 200. Not every app in the set of apps 204 will reside on every infotainment system nor be used by every user in the set of users 202. For a fully deployed system, the set of apps may number in the tens of thousands or more.

A rating module 206 includes an explicit user rating module 208 and an implicit user rating module 210. User ratings of apps can be either explicit or implicit. Explicit rating data can be collected by allowing a user to directly rate a particular app, for example, on a scale of 1 to 5 stars. The explicit user rating module 208 collects all such available explicit user ratings of apps.

Implicit rating data can be defined as shown in Equation (1) above, modified to allow for ratings from multiple users as follows:

$$r(U_m, A_n) = w_{R1} \cdot V_{R1} + w_{R2} \cdot V_{R2} + w_F \cdot V_F + w_D \cdot V_D + w_M \cdot V_M \quad (6)$$

Where $r(U_m,A_n)$ is the rating given by a user $U_m$ to an app $A_n$, $V_{R1}$ is a value defining recency of viewing the app, $V_{R2}$ is a value defining recency of using the app, $V_F$ is a value defining frequency of using the app, $V_D$ is a value defining duration of using the app, and $V_M$ is a value defining a monetary value (or amount paid) for the app. The w variables are weighting values for the respective values V in the equation, and are inter-related such that $w_{R1}+w_{R2}+w_F+w_D+w_M=1$. The implicit user rating module 210 collects implicit user ratings of apps as defined in Equation (6).

The rating module 206 combines the explicit and implicit user ratings of apps in any suitable fashion, to provide ratings by as many users as possible for as many apps as possible. For example, the rating module 206 may use weighted averaging to provide aggregated user/app rating data, where the weighted averaging gives higher weight to explicit ratings than implicit ratings. Alternately, the rating module 206 may forego calculation of an implicit rating for any user-application pair for which an explicit rating has been given by the user.

In any case, the aggregated user/app rating data is provided to a filtering module 212, which can filter both the users and the apps for relevance before further processing. For example, the users may be filtered to include only infotainment system users from certain vehicle types, or filtered based on attributes of the users. Likewise, the apps may be filtered by location awareness, freshness, or attributes of the apps in the application manifest (such as which application APIs are used).

The filtered user/app rating data is provided to a recommendation module 214. The recommendation module 214 includes a user-driven consensus module 216 and an app-driven consensus module 218, which are discussed below. The user-driven consensus module 216 and the app-driven consensus module 218 provide user/app correlation data to a recommendation synthesizer 220. The recommendation synthesizer 220 uses the user/app correlation data from the user-driven consensus module 216 and the app-driven consensus module 218, along with optional external inputs 222, to make specific recommendations of apps to users. The external inputs 222 may include any cloud- or "cyberspace"-based inputs, such as app recommendations from Internet search engines, makers of mobile device operating systems, Internet shopping services, etc.

Discussion will now be directed to how the user-driven consensus module 216 and the app-driven consensus module 218 determine the user/app correlation data, identifying likely apps of interest for particular users, from the filtered user/app rating data. This determination is made via calculation of similarity measures, and can be visualized using bipartite graphs.

Figure 6A:
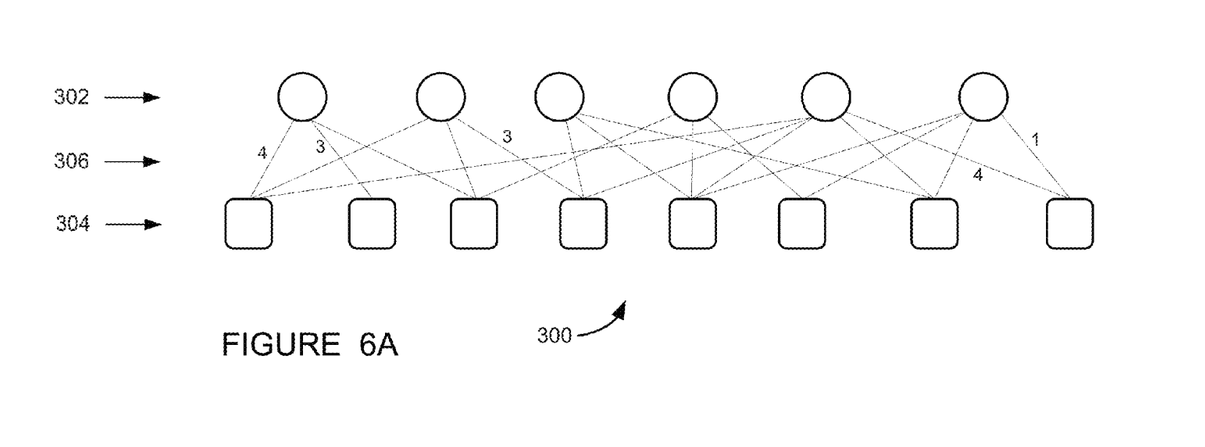
FIG. 6A is a diagram of a bipartite graph which contains known rating information by a set of users for a set of apps.

FIG. 6A is a diagram of a bipartite graph 300 which contains known rating information by a set of users 302 for a set of apps 304. The users 302 and the apps 304 have preferably been filtered as discussed above. That is, the bipartite graph 300 is constructed using the filtered user/app rating data from the filtering module 212. The graph 300 shows only a limited number of the users 302 and the apps 304 for clarity. The number of the users 302 need not be the same as the number of the apps 304 in the bipartite graph 300, and there could be more users than apps or more apps than users, depending on how the filtering was performed.

Every known rating of an app by a user, whether implicit, explicit or combined, is displayed as a relationship line 306 on the bipartite graph 300. For example, the first (leftmost) user has rated the first app as a 4, the first user has rated the second app as a 3, the second user has rated the fourth app as a 3, and so forth, and the last user has rated the last app as a 1. Only a few rating numbers are shown on the graph 300 in order to avoid cluttering the image, but each of the relationship lines 306 actually has a rating number associated with it, based on implicit or explicit user ratings of apps as discussed above. Integer rating values are shown for simplicity, but the ratings on the relationship lines 306 need not be integer values.

In viewing the graph 300, it is apparent that many of the relationship lines 306 are missing; that is, the relationship or rating of certain users to certain apps is unknown, which most likely indicates that the user in question has not viewed or used the app in question. For example, the first user does not have a rating for the fourth app, the second user does not have a rating for the second app, etc.

Figure 6B:
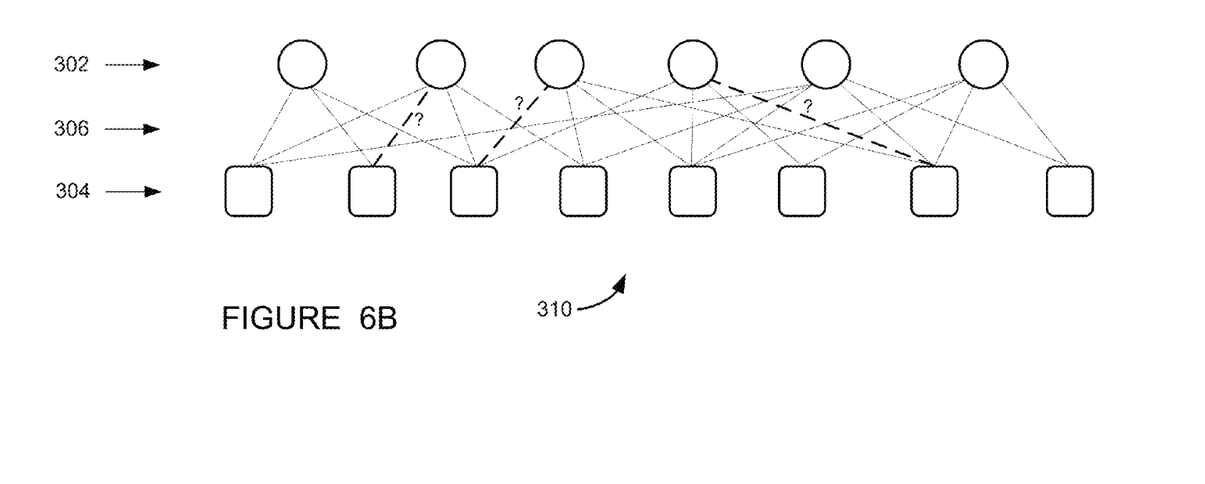
FIG. 6B is a diagram of a bipartite graph which shows how some unknown relationships can be inferred from existing user app rating data.

FIG. 6B is a diagram of a bipartite graph 310 which shows how some unknown relationships can be inferred from existing user app rating data. In the graph 310, some of the relationship lines 306 which were missing in the graph 300 have been filled in with a bold, dashed line annotated with a question mark. Although no rating data exists for these unknown relationships, similarity engine techniques may be used to infer a rating. If a relationship can be inferred where none exists, then this relationship could be used by the recommendation synthesizer 220 as a basis for recommending the app to the user if the inferred rating is high.

The user-driven consensus module 216 can compute an inferred rating of an app by a user in the following manner. First, a similarity measure is calculated between a targeted user and other users, as follows:

$$Sim(U_i, U_j) = \frac{\sum_{a_l \in A} [r(U_i, a_l) - \bar{r}(U_i)][r(U_j, a_l) - \bar{r}(U_j)]}{\sqrt{\sum_{a_l \in A} [r(U_i, a_l) - \bar{r}(U_i)]^2} \sqrt{\sum_{a_l \in A} [r(U_j, a_l) - \bar{r}(U_j)]^2}} \quad (7)$$

Where $Sim(U_i,U_j)$ is the similarity between a targeted user $U_i$ and another user $U_j$, the summations are taken for each app $a_l$ which is an element of the set of apps A which have been rated by both the user $U_i$ and $U_j$, $r(U_i,a_l)$ is the rating given by the user $U_i$ to the app $a_l$ (and likewise for user $U_j$), and $\bar{r}$ is the average rating given to all apps by the user i or j. Using Equation (7), similarities between users are determined by comparing their ratings of common apps.

Next, a number K of the nearest neighbors of the targeted user are identified from the similarity measure. The K nearest neighbors are intended to be users who are like-minded to the targeted user, and hence would be likely to have a similar attitude toward a particular app for which the targeted user has no rating.

Finally, an inferred rating of a particular app by the targeted user is calculated by aggregating the consensus of the K nearest neighbor users, as follows:

$$\hat{r}(U_h, a_l) = \bar{r}(U_h) + \frac{\sum_{k=1}^{K} Sim(U_h, U_k)[r(U_k, a_l) - \bar{r}(U_k)]}{\sum_{k=1}^{K} Sim(U_h, U_k)} \quad (8)$$

Where $\hat{r}(U_h,a_l)$ is the inferred rating of the app $a_l$ by the targeted user $U_h$, $\bar{r}(U_h)$ is the average rating of all apps by the targeted user $U_h$, the summations are taken for each user k in the K nearest neighbors, and the ratings (r and f) and the similarities $Sim(U_h,U_k)$ were defined above.

As described in the preceding three paragraphs, including Equations (7) and (8), the user-driven consensus module 216 can compute an inferred rating of an app by a user where no rating was previously available, based on user similarities. The inferred rating from the user-driven consensus module 216 can be used by the recommendation synthesizer 220 to make specific recommendations of apps to users where the inferred rating value is high.

The app-driven consensus module 218 can compute an inferred rating of an app by a user in a similar manner to that described above, except from an app similarity perspective rather than a user similarity perspective. First, a similarity measure is calculated between a targeted app and other apps, as follows:

$$Sim(a_i, a_j) = \frac{\sum_{u_m \in U} [r(u_m, a_i) - \bar{r}(u_m)][r(u_m, a_j) - \bar{r}(u_m)]}{\sqrt{\sum_{u_m \in U} [r(u_m, a_i) - \bar{r}(u_m)]^2} \sqrt{\sum_{u_m \in U} [r(u_m, a_j) - \bar{r}(u_m)]^2}} \quad (9)$$

Where $Sim(a_i, a_j)$ is the similarity between a targeted app $a_i$ and another app $a_j$, the summations are taken for each user $u_m$ which is an element of the set of users U which have rated both the app $a_i$ and $a_j$, $r(u_m, a_i)$ is the rating given by the user $u_m$ to the app $a_i$ (and likewise for app $a_j$), and $\bar{r}(u_m)$ is the average rating given to all apps by the user $u_m$. Using Equation (9), similarities between apps are determined by comparing their ratings by common users.

Next, a number K of the nearest neighbors of the targeted app are identified from the similarity measure. The K nearest neighbors are intended to be apps which are like-attributed to the targeted app, and hence would be likely to have a similar attractiveness for a particular user for which the targeted app has no rating.

Finally, an inferred rating of the targeted app by a particular user is calculated by aggregating the consensus of the K nearest neighbor apps, as follows:

$$\hat{r}(U_h, a_l) = \bar{r}(a_l) + \frac{\sum_{k=1}^{K} Sim(a_l, a_k)[r(U_h, a_k) - \bar{r}(a_k)]}{\sum_{k=1}^{K} Sim(a_l, a_k)} \quad (10)$$

Where $\hat{r}(U_h, a_l)$ is the inferred rating of the targeted app $a_l$ by the user $U_h$, $\bar{r}(a_l)$ is the average rating of the targeted app $a_l$ by all users, the summations are taken for each app k in the K nearest neighbors, and the ratings (r and $\bar{r}$) and the similarities $Sim(a_l, a_k)$ were defined above.

As described in the preceding three paragraphs, including Equations (9) and (10), the app-driven consensus module 218 can compute an inferred rating of an app by a user where no rating was previously available, based on app similarities. The inferred rating from the app-driven consensus module 218 can be used by the recommendation synthesizer 220 to make specific recommendations of apps to users where the inferred rating value is high.

The outputs from the user-driven consensus module 216 and the app-driven consensus module 218, along with the optional external inputs 222, are used by the recommendation synthesizer 220 to make specific recommendations of apps to users. The recommendation synthesizer 220 can combine the inputs from the user-driven consensus module 216, the app-driven consensus module 218 and the optional external inputs 222 in any suitable fashion—such as a simple average, a weighted average, or other information fusion operator.

Figure 7:
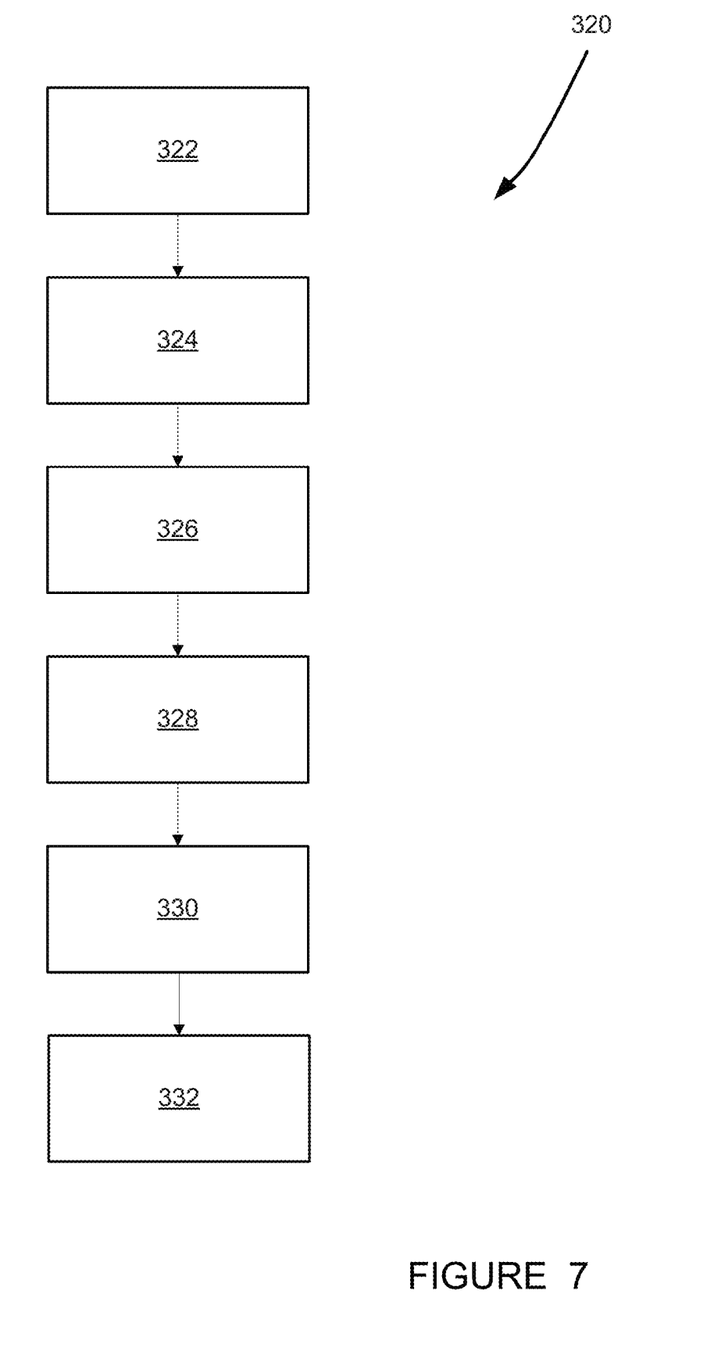
FIG. 7 is a flowchart diagram of a method for making user recommendations for infotainment system apps.

FIG. 7 is a flowchart diagram 320 of a method for making user recommendations for infotainment system apps. At box 322, app rating data for many apps from many users of in-vehicle infotainment systems are collected. The data may be wirelessly transmitted from the vehicle infotainment systems to a central server. The data may include both explicit ratings of apps by users, and implicit ratings which are calculated based on factors such as recency of viewing the app, recency of using the app, frequency of using the app, duration of usage of the app and monetary value of the app. The explicit and implicit user ratings of apps may be combined before further processing.

At box 324, the user/app rating data is filtered for relevance. Users may be filtered based on attributes of the users, and apps may be filtered based on attributes of the apps, to provide a set of users, apps and ratings which is most relevant to the recommendation at hand. At box 326, the filtered user/app rating data is used to compute inferred ratings for user/app relationships where no rating is available, using a user-driven consensus calculation. As discussed above, the user-driven consensus calculation computes an inferred rating of an app by a user where no rating was previously available, based on user similarities in ratings of common apps. At box 328, the filtered user/app rating data is used to compute inferred ratings for user/app relationships where no rating is available, using an app-driven consensus calculation. As discussed above, the app-driven consensus calculation computes an inferred rating of an app by a user where no rating was previously available, based on app similarities in ratings by common users.

At box 330, the inferred ratings from the user-driven consensus calculation and the app-driven consensus calculation are used to synthesize specific app recommendations for specific users. The app recommendation synthesis may also include external inputs, such as app recommendations from Internet search engines, makers of mobile device operating systems, Internet shopping services, etc. The inferred ratings and the external inputs may be combined in any suitable fashion, such as a simple average or a weighted average. At box 332, the synthesized recommendations for app consideration are provided to the appropriate user via downloading from the central server to the infotainment system in the user's vehicle.

App recommendations which are made based on real user/app relationship data—as opposed to simple app categories, for example—have a much better chance of being well received by users of in-vehicle infotainment systems. This high quality recommendation service results in increased customer satisfaction for the infotainment system itself and the vehicle overall.

Using the techniques described above, infotainment system app usage data, including implicit user ratings and context correlations, can be analyzed to detect usage trends. The detected usage trends can be beneficial to vehicle manufacturers and app developers in guiding future development, and helpful recommendations can be made to users based on the app usage data collected from the entire user population.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for making user recommendations for infotainment system applications, said method comprising:
    collecting, on a central server computer including a processor and a memory module, user rating data for in-vehicle infotainment system applications from many infotainment system users, including both explicit ratings and implicit ratings;
    filtering the user rating data for the applications based on relevance to produce filtered user/application rating data;
    computing, on the central server computer, inferred ratings for user/application relationships where no rating is available, using the filtered user/application rating data in a user-driven consensus calculation;
    computing, on the central server computer, inferred ratings for user/application relationships where no rating is available, using the filtered user/application rating data in an application-driven consensus calculation;
    synthesizing user application recommendations based on the inferred ratings from the user-driven consensus calculation and the application-driven consensus calculation; and
    providing the user application recommendations to the infotainment system users for the user/application relationships where no rating is available and the inferred ratings are high.

2. The method of claim 1 wherein the implicit ratings are calculated based on recency of a user viewing an application, recency of the user using the application, frequency of the user using the application, duration of the user's usage of the application and monetary value of the application.

3. The method of claim 1 further comprising combining the explicit ratings and the implicit ratings using a weighted average before filtering the user rating data.

4. The method of claim 1 wherein filtering the user rating data includes filtering the users based on user attributes and filtering the applications based on application attributes.

5. The method of claim 1 wherein the user-driven consensus calculation includes calculating a similarity between a target user and other users based on applications which both the target user and the other users have rated.

6. The method of claim 5 wherein the user-driven consensus calculation also includes identifying nearest neighbor users, which are the other users that are nearest neighbors to the target user in application rating similarity.

7. The method of claim 6 wherein the user-driven consensus calculation also includes calculating an inferred rating of a particular application by the target user based on the similarity between the target user and the nearest neighbor users, ratings of the particular application by the nearest neighbor users, and an average rating of all applications by the target user.

8. The method of claim 1 wherein the application-driven consensus calculation includes calculating a similarity between a target application and other applications based on users that have rated both the target application and the other applications.

9. The method of claim 8 wherein the application-driven consensus calculation also includes identifying nearest neighbor applications, which are the other applications which are nearest neighbors to the target application in user rating similarity.

10. The method of claim 9 wherein the application-driven consensus calculation also includes calculating an inferred rating of the target application by a particular user based on the similarity between the target application and the nearest neighbor applications, ratings by the particular user of the nearest neighbor applications, and an average rating by all users of the target application.

11. The method of claim 1 wherein synthesizing user application recommendations includes using the inferred ratings from the user-driven consensus calculation and the application-driven consensus calculation, along with external cyberspace-based inputs, in a weighted average calculation.

12. A method for making user recommendations for infotainment system applications, said method comprising:
    collecting, on a central server computer including a processor and a memory module, user rating data for in-vehicle infotainment system applications from many infotainment system users, including both explicit ratings and implicit ratings, where the implicit ratings are calculated based on recency of a user viewing an application, recency of the user using the application, frequency of the user using the application, duration of the user's usage of the application and monetary value of the application;
    filtering the user rating data for the applications based on relevance to produce filtered user/application rating data, including filtering the users based on user attributes and filtering the applications based on application attributes;
    computing, on the central server computer, inferred ratings for user/application relationships where no rating is available, using the filtered user/application rating data in a user-driven consensus calculation;
    computing, on the central server computer, inferred ratings for user/application relationships where no rating is available, using the filtered user/application rating data in an application-driven consensus calculation;
    synthesizing user application recommendations based on the inferred ratings from the user-driven consensus calculation and the application-driven consensus calculation, including using the inferred ratings from the user-driven consensus calculation and the application-driven consensus calculation, along with external cyberspace-based inputs, in a weighted average calculation; and
    providing the user application recommendations to the infotainment system users for the user/application relationships where no rating is available and the inferred ratings are high.

13. The method of claim 12 wherein:
    the user-driven consensus calculation includes calculating an inferred rating of a particular application by a target user based on a similarity between the target user and a set of nearest neighbor users, ratings of the particular application by the nearest neighbor users, and an average rating of all applications by the target user, where the nearest neighbor users are other users that are nearest neighbors to the target user in application rating similarity; and
    the application-driven consensus calculation includes calculating an inferred rating of a target application by a particular user based on a similarity between the target application and a set of nearest neighbor applications, ratings by the particular user of the nearest neighbor applications, and an average rating by all users of the target application, where the nearest neighbor applications are other applications that are nearest neighbors to the target application in user rating similarity.

14. A system for making user recommendations for infotainment system applications, said system comprising:
- a computer including a processor, a memory module and a network connection, where the computer is configured with an algorithm for recommending infotainment system applications including;
- a rating module configured to collect and process user rating data for in-vehicle infotainment system applications from many infotainment system users, including both explicit ratings and implicit ratings, where the user rating data is wirelessly uploaded from a plurality of road vehicles;
- a filtering module configured to filter the user rating data for the applications based on relevance to produce filtered user/application rating data;
- a user-driven consensus module configured to compute inferred ratings for user/application relationships where no rating is available, using the filtered user/application rating data in a user-driven consensus calculation;
- an application-driven consensus module configured to compute inferred ratings for user/application relationships where no rating is available, using the filtered user/application rating data in an application-driven consensus calculation; and
- a recommendation synthesizer module configured to synthesize user application recommendations based on the inferred ratings from the user-driven consensus module and the application-driven consensus module, and provide the recommendations to the infotainment system users for the user/application relationships where no rating is available and the inferred ratings are high.

15. The system of claim 14 wherein the implicit ratings are calculated based on recency of a user viewing an application, recency of the user using the application, frequency of the user using the application, duration of the user's usage of the application and monetary value of the application.

16. The system of claim 14 wherein the user-driven consensus module calculates a similarity between a target user and other users based on applications which both the target user and the other users have rated, and identifies nearest neighbor users, which are the other users that are nearest neighbors to the target user in application rating similarity.

17. The system of claim 16 wherein the user-driven consensus module also calculates an inferred rating of a particular application by the target user based on the similarity between the target user and the nearest neighbor users, ratings of the particular application by the nearest neighbor users, and an average rating of all applications by the target user.

18. The system of claim 14 wherein the application-driven consensus module calculates a similarity between a target application and other applications based on users that have rated both the target application and the other applications, and identifies nearest neighbor applications, which are the other applications which are nearest neighbors to the target application in user rating similarity.

19. The system of claim 18 wherein the application-driven consensus module also calculates an inferred rating of the target application by a particular user based on the similarity between the target application and the nearest neighbor applications, ratings by the particular user of the nearest neighbor applications, and an average rating by all users of the target application.

20. The system of claim 14 wherein the recommendation synthesizer module includes the inferred ratings from the user-driven consensus module and the application-driven consensus module, along with external cyberspace-based inputs, in a weighted average calculation.

* * * * *